United States Patent
Gudi et al.

(10) Patent No.: US 12,510,457 B2
(45) Date of Patent: Dec. 30, 2025

(54) SYSTEM FOR DETECTING DEBRIS IN A FLUID

(71) Applicant: HONEYWELL INTERNATIONAL INC., Charlotte, NC (US)

(72) Inventors: Ravindra Gudi, Bangalore (IN); Lingaraju L R, Bangalore (IN); Prakash V S, Bangalore (IN); Seenu K, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 146 days.

(21) Appl. No.: 18/585,277

(22) Filed: Feb. 23, 2024

(65) Prior Publication Data

US 2025/0231097 A1 Jul. 17, 2025

(30) Foreign Application Priority Data

Jan. 11, 2024 (IN) .............................. 202411002115

(51) Int. Cl.
G01N 15/1031 (2024.01)
G01N 15/10 (2024.01)
G01N 33/28 (2006.01)

(52) U.S. Cl.
CPC ..... *G01N 15/1031* (2013.01); *G01N 33/2858* (2013.01); *G01N 2015/1029* (2024.01)

(58) Field of Classification Search
CPC .......... G01N 15/1031; G01N 33/2888; G01N 33/2858
USPC ....................................................... 324/204
See application file for complete search history.

(56) References Cited

U.S. PATENT DOCUMENTS

| 5,674,401 A | 10/1997 | Dickert et al. |
| 2010/0109686 A1* | 5/2010 | Zhe ..................... G01N 15/1031 324/698 |
| 2010/0126251 A1* | 5/2010 | Pileggi ............... G01N 33/2888 73/53.07 |
| 2015/0198578 A1 | 7/2015 | Worden et al. |
| 2016/0370275 A1 | 12/2016 | Weiser |

(Continued)

FOREIGN PATENT DOCUMENTS

| CN | 110243736 A | 9/2019 |
| CN | 114993896 A | 9/2022 |
| CN | 116297053 A | 6/2023 |

(Continued)

OTHER PUBLICATIONS

Wu, Xianwei, et al., "A New Inductive Debris Sensor Based on Dual-Excitation Coils and Dual-Sensing Coils for Online Debris Monitoring," Sensors; Basel vol. 21, Iss. 22 (2021): 7556, DOI: 10.3390/s21227556.

*Primary Examiner* — Roberto Velez
(74) *Attorney, Agent, or Firm* — Ingrassia Fisher & Lorenz LLP (57) ABSTRACT

A detection system for detecting debris in a fluid may include one or more of an inductive sensor, a Hall sensor, a capacitive sensor, and a sensor processing system. The sensor processing, using the signals supplied from the one or more sensors, may do one or more of estimate a size of each debris that has interacted with the magnet field, determine a total number of debris particles that have interacted with the magnet field, determine a cumulative quantity of the debris particles attracted by and contacting the magnet, and determine the viscosity of the fluid.

12 Claims, 6 Drawing Sheets

(56) References Cited

U.S. PATENT DOCUMENTS

2023/0146993 A1    5/2023  Carroll
2024/0344962 A1*  10/2024  Bravo Imaz ....... G01N 15/1459

FOREIGN PATENT DOCUMENTS

| CN | 116576001   A  | 8/2023 |
| DE | 102016221289 A1 | 2/2018 |
| EP | 3220168     A1 | 9/2017 |

* cited by examiner

SYSTEM FOR DETECTING DEBRIS IN A FLUID

CROSS REFERENCE TO RELATED APPLICATION

The present application claims benefit of prior filed India Provisional Patent Application No. 202411002115, filed Jan. 11, 2024, which is hereby incorporated by reference herein in its entirety.

TECHNICAL FIELD

The present disclosure relates to debris detection systems and, more particularly, to a system for detecting debris in a fluid, such engine lubricant.

BACKGROUND

Many devices and systems that include moving mechanical components rely on a lubricating fluid, such as oil, to reduce wear within the devices and systems. For example, many engines, such as gas turbine engines, include numerous moving mechanical components, which are supplied with lubricant from a lubricant supply system. However, even though these components are well lubricated, normal wear during operation can cause relatively fine metal particles to wear off these components and be deposited in the lubricant. Thus, many of these systems and devices may include one or more detectors to detect the relatively fine metal particles (i.e., debris) that are present in the lubricant.

One particular type of a detector used in many gas turbine engines (and other environments) is known as a Metal Chip Detector (MCD) or Oil Debris Detector/Sensor. This type of detector/sensor magnetically attracts at least a portion of the fine metal debris particles that are present in the lubricant and, in some instances, can be used to determine the amount of debris (e.g., debris particle count) collected by the sensor. Beyond this, however, presently known debris detectors/sensors provide no other quantitative information, such as total mass of debris collected by the sensor. These presently known debris detectors/sensors also provide no qualitative information, such as debris particle size and lubricant quality. This latter information can be significant since relatively large debris particle size may indicate that particular engine parts need to be checked.

Due to the above-noted shortcomings of presently known debris detectors/sensors, many fluid lubricated systems, such as engines, may undergo premature and repeated manual inspections, as well as detailed debris particle analyses in a laboratory. This can result in downtimes that may last from weeks to months. Hence, there is a need for a debris detector/sensor that can provide not only quantitative information regarding debris, but qualitative information regarding the debris and the lubricant. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a detection system for detecting debris in a fluid includes an inductive sensor and a sensor processing system. The inductive sensor includes a magnet, a primary coil surrounding the magnet, and a secondary coil surrounding the magnet. The magnet produces a magnetic field. The primary coil is coupled to receive an excitation signal and is configured, upon receipt of the excitation signal, to generate a primary magnetic flux. The secondary coil is inductively coupled to the primary coil upon electrical excitation of the primary coil and is configured to supply a sensor output signal having an output voltage magnitude that varies each time a debris particle in the fluid interacts with the magnetic field. The sensor processing system is coupled to the inductive sensor and is configured to supply the excitation signal to the primary coil and to receive the sensor output signal from the secondary coil. The sensor processing system is further configured, upon receipt of the sensor output signal, to estimate a size of each debris particle attracted by and contacting the magnet and determine a total number of debris particles attracted by and contacting the magnet.

In another embodiment, a detection system for detecting debris in a fluid includes an inductive sensor, a Hall sensor, and a sensor processing system. The inductive sensor includes a magnet, a primary coil surrounding the magnet, and a secondary coil surrounding the magnet. The magnet produces a magnetic field. The primary coil is coupled to receive an excitation signal and is configured, upon receipt of the excitation signal, to generate a primary magnetic flux. The secondary coil is inductively coupled to the primary coil upon electrical excitation of the primary coil and is configured to supply a sensor output signal having an output voltage magnitude that varies each time a debris particle in the fluid interacts with the magnetic field. The Hall sensor is disposed adjacent to the magnet and is configured to supply a Hall sensor output signal proportional to a sensed magnetic field strength. The sensor processing system is coupled to the inductive sensor and the Hall sensor. The sensor processing system is configured to supply the excitation signal to the primary coil, receive the sensor output signal from the secondary coil, and receive the Hall sensor output signal from the Hall sensor. The sensor processing system further configured: upon receipt of the sensor output signal, to (i) estimate a size of each debris particle attracted by and contacting the magnet and (ii) determine a total number of debris particles attracted by and contacting the magnet, and upon receipt of the Hall sensor output signal, to determine a cumulative weight of the debris particles attracted by and contacting the magnet.

In yet another embodiment, a detection system for detecting debris in a fluid includes an inductive sensor, a Hall sensor, a capacitive sensor, and a sensor processing system. The inductive sensor includes a magnet, a primary coil surrounding the magnet, and a secondary coil surrounding the magnet. The magnet produces a magnetic field. The primary coil is coupled to receive an excitation signal and is configured, upon receipt of the excitation signal, to generate a primary magnetic flux. The secondary coil is inductively coupled to the primary coil upon electrical excitation of the primary coil and is configured to supply a sensor output signal having an output voltage magnitude that varies each time a debris particle in the fluid interacts with the magnetic field. The Hall sensor is disposed adjacent to the magnet and is configured to supply a Hall sensor output signal proportional to a sensed magnetic field strength. The capacitive sensor is disposed adjacent to the inductive sensor and is configured to supply a capacitive sensor output signal proportional to a viscosity of the fluid. The sensor processing system is coupled to the inductive sensor, the Hall sensor, and the capacitive sensor. The sensor processing system is configured to supply the excitation signal to the primary coil, receive the sensor output signal from the secondary coil, receive the Hall sensor output signal from the Hall sensor, and receive the capacitive sensor output signal from the capacitive sensor. The sensor processing system is further configured: upon receipt of the sensor output signal, to (i) estimate a size of each debris particle attracted by and contacting the magnet and (ii) determine a total number of debris particles attracted by and contacting the magnet, upon receipt of the Hall sensor output signal, to determine a cumulative quantity of the debris particles attracted by and contacting the magnet, and upon receipt of the capacitive sensor output signal, to determine the viscosity of the fluid.

Furthermore, other desirable features and characteristics of the detection system for detecting debris in a fluid will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this regard, although the detection system described herein as being implemented in an engine, and that the particular fluid is lubricant, it will be appreciated that the detection system may be implemented in various other devices and systems, and may be used to detect debris in various types of fluids, not just lubricants.

Figure 1:
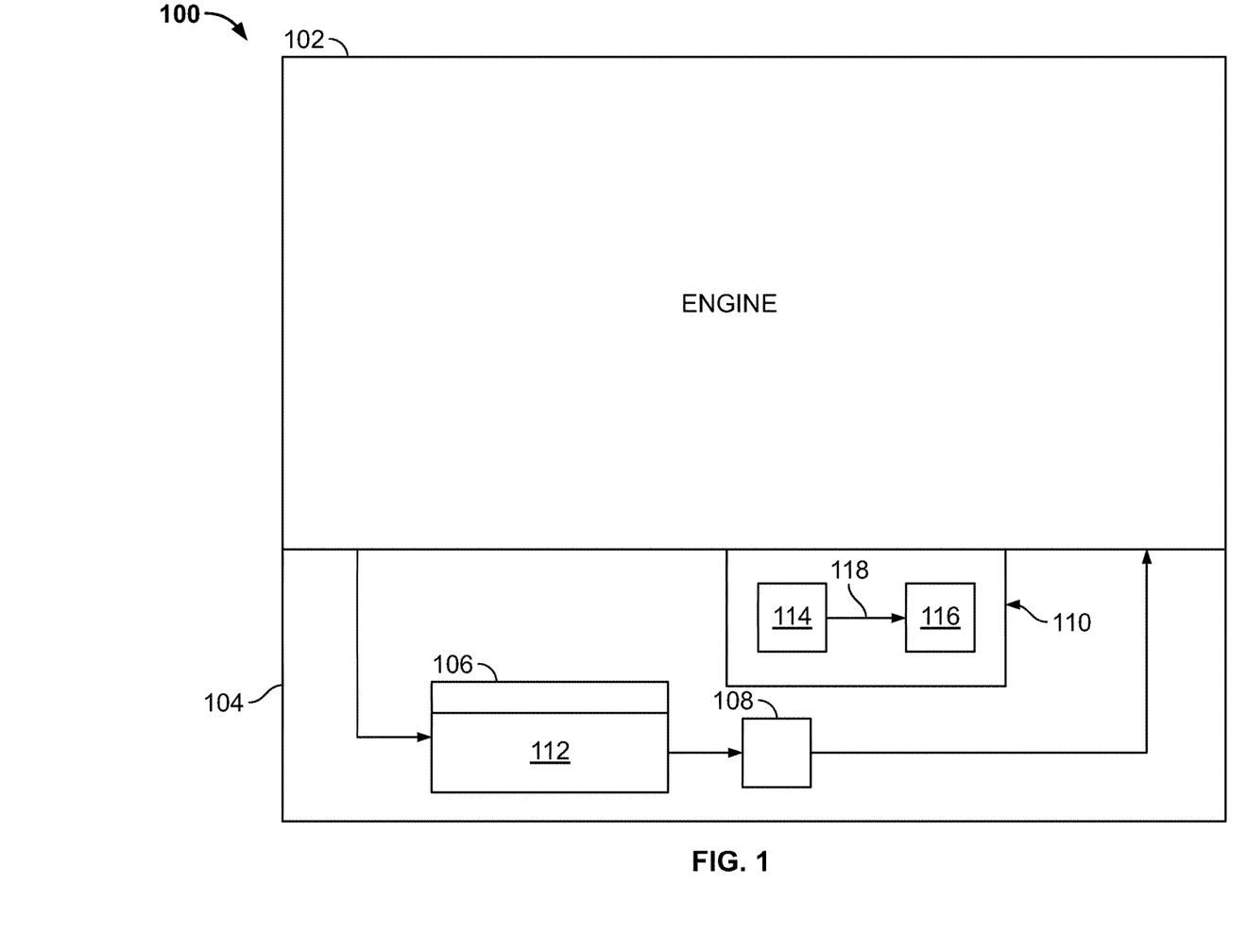
FIG. 1 depicts a functional block diagram of one embodiment of an engine system.

With the above in mind, and with reference first to FIG. 1, a functional block diagram of one embodiment of an engine system 100 is depicted. The depicted engine system 100 includes at least an engine 102 and a lubricant source 104. The engine 102 may be configured as any one of numerous known types of engines that rely on lubricant to reduce friction between moving parts. For example, the engine 102 may be any one of numerous types of internal combustion engines, diesel engines, or gas turbine engines, just to name a few.

No matter the particular type and configuration, the engine 102 is supplied with a lubricating fluid from the lubricant supply source 104. The lubricant supply source 104 may include, for example, a lubricant reservoir 106 and one or more lubricant pumps 108 (which may, in some embodiments, be disposed within the engine 102). The lubricant reservoir 108 retains a supply of lubricating fluid 112, such as oil. The one or more lubricant pumps 108 draw the lubricating fluid 112 from the lubricant reservoir 106 and provide a motive force to circulate the lubricating fluid 112 into the engine 102 to lubricate various moving parts therein, and then back to the lubricant reservoir 106.

As already noted, although the moving components within the engine 102 are well lubricated, normal wear during operation can cause relatively fine metal particles to wear off these components and be deposited in the lubricating fluid 112. Thus, as FIG. 1 further depicts, the engine system 100 additionally includes a detection system 110 for detecting debris in the lubricating fluid 112.

Figure 2:
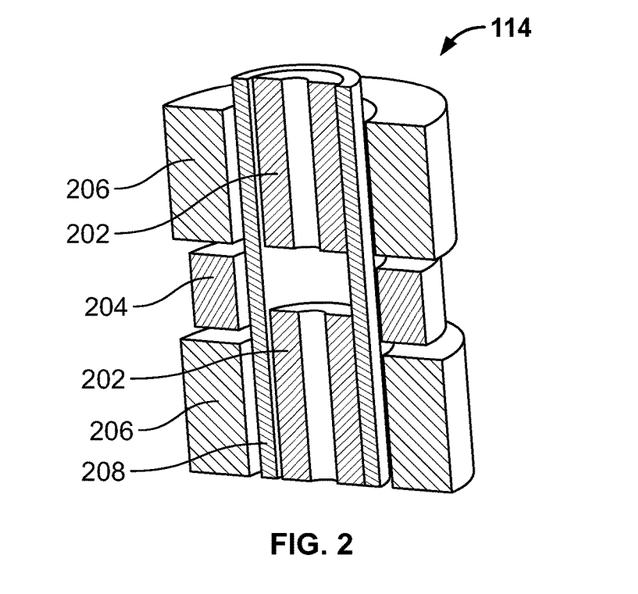
FIG. 2 depicts a plan view of one embodiment of an inductive sensor that may be implemented in the system of FIG. 1.

The depicted detection system 110 includes at least an inductive sensor 114 and a sensor processing system 116. The inductive sensor 114, an embodiment of which is depicted in FIG. 2, includes a magnet 202, a primary coil 204, and a secondary coil 206. The magnet 202 produces a magnetic field and is disposed within a magnet housing 208, which may be formed, for example, of low carbon stainless steel. The primary coil 204 and the secondary coil 206 both surround the magnet 202 and, at least in the depicted embodiment, are disposed outside of the magnet housing 208. As FIG. 2 also depicts, the primary coil 204, at least in the depicted embodiment, is axially disposed between two halves of the secondary coil 206.

Figure 3:
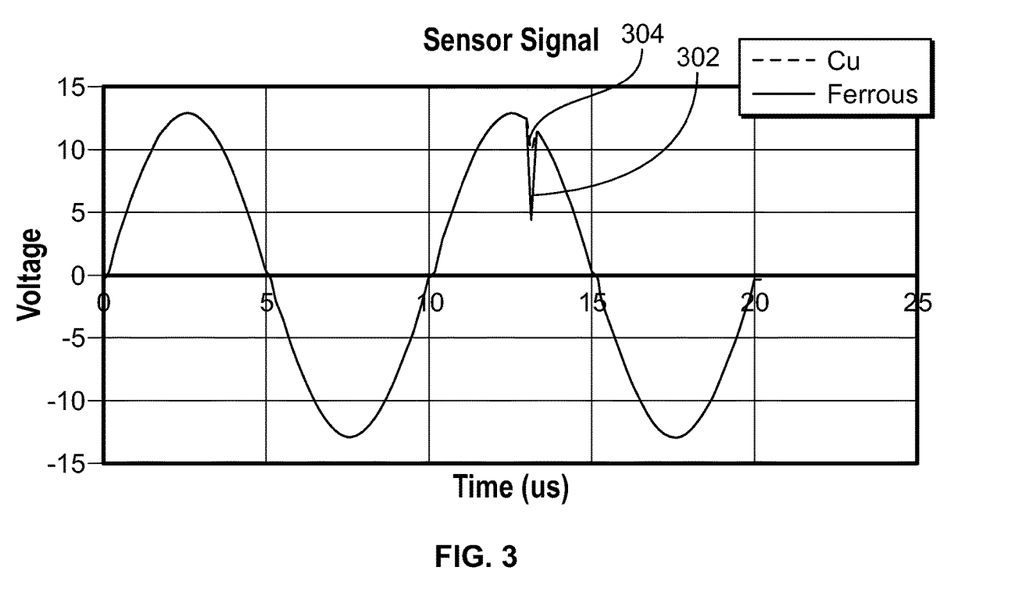
FIG. 3 depicts variations in the output voltage magnitude of the inductive sensor of FIG. 2 when debris particles interact with the magnetic field.

The primary coil 204 is also coupled to receive an excitation signal and, as may be appreciated, is configured, upon receipt of the excitation signal, to generate a primary magnetic flux. The secondary coil 206 is inductively coupled to the primary coil 204 upon electrical excitation of the primary coil 204 and is configured to supply a sensor output signal 118 (see FIG. 1). The sensor output signal 208 has an output voltage magnitude that varies each time a debris particle in the lubricating fluid 112 interacts with the magnetic field of the magnet 202 linking to the secondary coil 206. This is depicted more clearly in FIG. 3, which shows the variation in the output voltage magnitude of the inductive sensor 114 when a debris particle made of a magnetic material 302, such as a ferrous material, interacts with the magnetic field, and when a debris particle made of a non-magnetic, but electrically conductive material 304, such as copper or aluminum.

Figure 4:
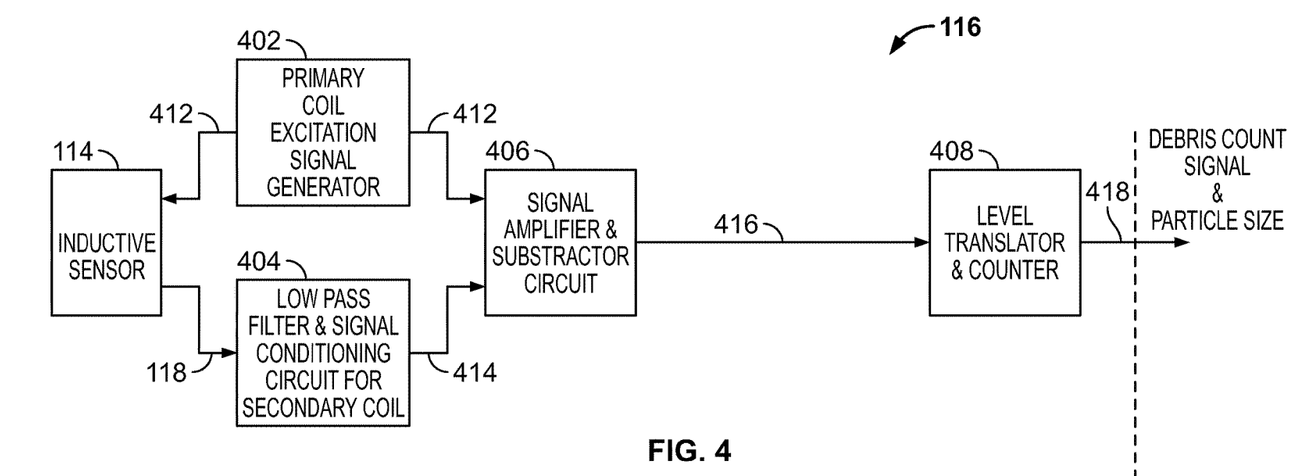
FIGS. 4 and 5 depict functional block diagrams of sensor processing systems that may be used with the inductive sensor of FIG. 2.

The sensor processing system 116 is coupled to the inductive sensor 114 and is configured to supply the excitation signal to the primary coil 204 and receive the sensor output signal from the secondary coil 206. The sensor processing system 116 is additionally configured, upon receipt of the sensor output signal, to estimate the size of each debris particle attracted by and interacting with the magnetic field and to determine the total number of debris particles attracted by and interacting with the magnetic field. One embodiment of the sensor processing system 116 is depicted in FIG. 4, and with reference thereto will now be described.

The depicted sensor processing system 116 includes an excitation signal generator 402, signal conditioning circuitry 404, an amplifier and subtractor circuit 406, and a level translator and counter circuit 408. The excitation signal generator 402 is coupled to the primary coil 204 (not shown in FIG. 4) of the inductive sensor 114 and is configured to generate and supply the excitation signal 412 to the primary coil 204. It also supplies the excitation signal 412 to the amplifier and subtractor circuit 406. As may be appreciated, the excitation signal 412 is an AC signal, the magnitude and frequency of which may vary from embodiment to embodiment. In one particular, but non-limiting embodiment, the magnitude and frequency are 3.0 VAC and 100 Hz.

The signal conditioning circuitry 404 is coupled to the secondary coil 206 (not shown in FIG. 4) of the inductive sensor 114 and receives the sensor output signal 118 therefrom. The signal conditioning circuitry 404 may be implemented using any one of numerous known circuit topologies and, at least in the depicted embodiment, additionally includes a low-pass filter, to thereby filter out any unwanted high frequencies in the sensor output signal 208. The signal conditioning circuitry 404 thus supplies a smoothed, filtered sensor output signal 414 to the amplifier and subtractor circuit 406.

The amplifier and subtractor circuit 406 is coupled to receive the excitation signal 412 from the excitation signal generator 402 and the smoothed, filtered sensor output signal 414 from the signal conditioning circuitry 404. The amplifier and subtractor circuit 406, using any one of numerous known circuit topologies, subtracts the output voltage magnitude of the smoothed, filtered sensor output signal 414 from the excitation signal 412, to thereby generate a difference signal 416 that is representative of the change in the output voltage magnitude. The difference signal 416 is amplified and supplied to the level translator and counter circuit 408.

The level translator and counter circuit 408 receives the difference signal 416 from the amplifier and subtractor circuit 406. The level translator and counter circuit 416, using any one of numerous known circuit topologies, supplies an output signal 418 to non-illustrated external circuitry, such as an engine controller (ECU, FADEC, etc.) or other similar control units capable of A-to-D conversion and basic microcontroller computing functions, for additional processing. The output signal 418 matches the voltage level requirements of the particular external circuitry, and the external circuitry is preferably configured to measure the signal amplitude and determine the debris size. The external circuitry is also preferably configured to count how many pulses it received to thereby determine the number of debris particles that have interacted with the magnetic field.

Figure 5:
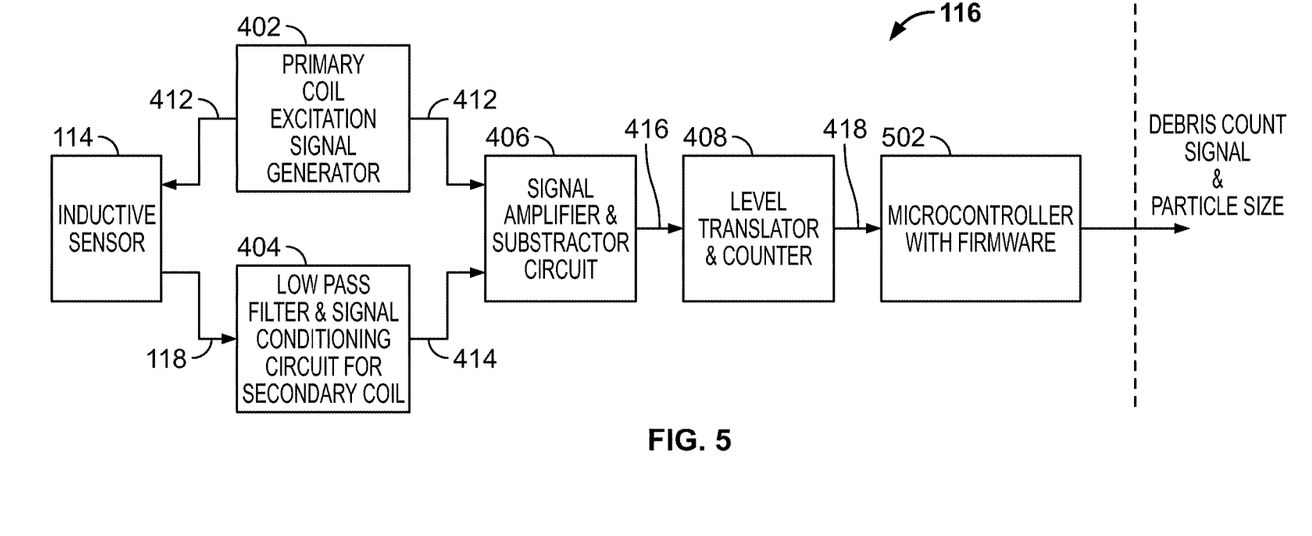

In some embodiments, as shown in FIG. 5, the sensor processing system 116 may additionally include a microcontroller 502. The microcontroller 502 receives the output signal 418 from the level translator and counter circuit 408 and, using an onboard analog-to-digital converter (ADC), converts it to digital data representative of the debris particle size. The digital data also indicates the number of debris particles that have interacted with the magnetic field. This information can be supplied to the non-illustrated external circuitry via, for example, a suitable communication interface such as CAN, RS232, etc.

Figure 6:
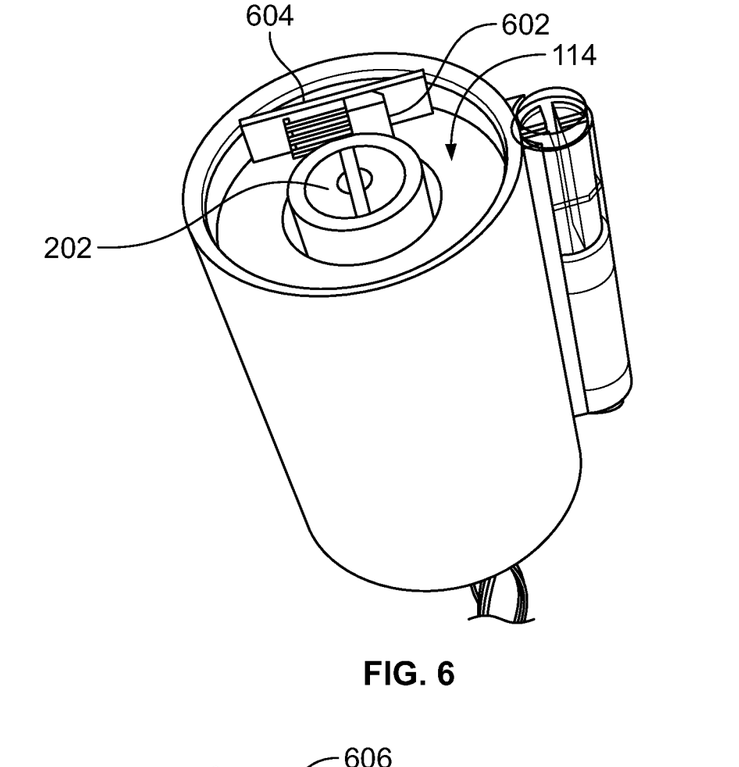
FIGS. 6 and 7 depict plan views of an embodiment of the inductive sensor of FIG. 2 that additionally includes a Hall sensor and a capacitive sensor and that may be implemented in the system of FIG. 1.
Figure 7:
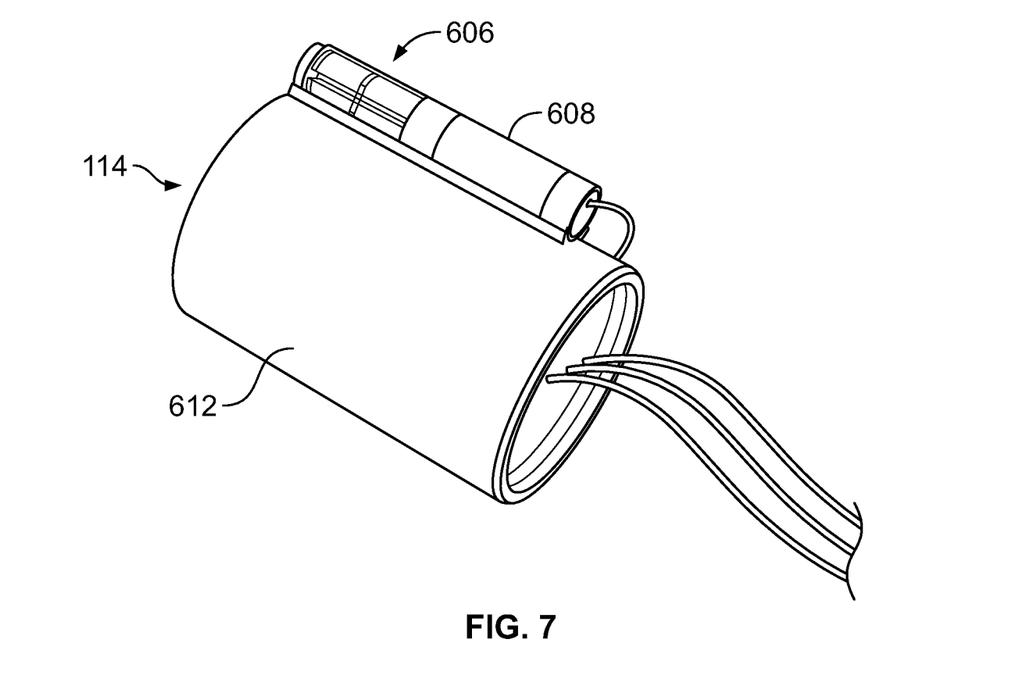

In some embodiments, the detection system 110 may additionally include a Hall sensor and/or a capacitive sensor. One such embodiment, which is implemented with both of these sensors is depicted in FIGS. 6 and 7. The Hall sensor 602, when included, is disposed adjacent to the magnet 202 of the inductive sensor 114. More specifically, at least in the depicted embodiment, it is disposed on a printed circuit board 604 that is mounted on the inductive sensor 114 adjacent to the magnet 202. A Hall sensor, as is generally known, senses the magnitude of a magnetic field (i.e., the magnetic field strength). In this case, the Hall sensor 602 senses the magnetic field strength of the magnet 202 and supplies a Hall sensor output signal, to the sensor processing system 116, that is proportional to the sensed magnetic field strength.

The capacitive sensor 606, when included, is disposed adjacent to the inductive sensor 114. In the depicted embodiment, it is disposed within a sensor housing 608 that is mounted on the outer housing 612 of the inductive sensor 114. The capacitive sensor 606 is disposed such that a portion of the lubricating fluid 112 flows through the sensor 606. The capacitive sensor 606 is configured to sense the viscosity of the fluid 112 and supply a capacitive sensor output signal, to the sensor processing system 116, that is proportional to the sensed viscosity.

Figure 8:
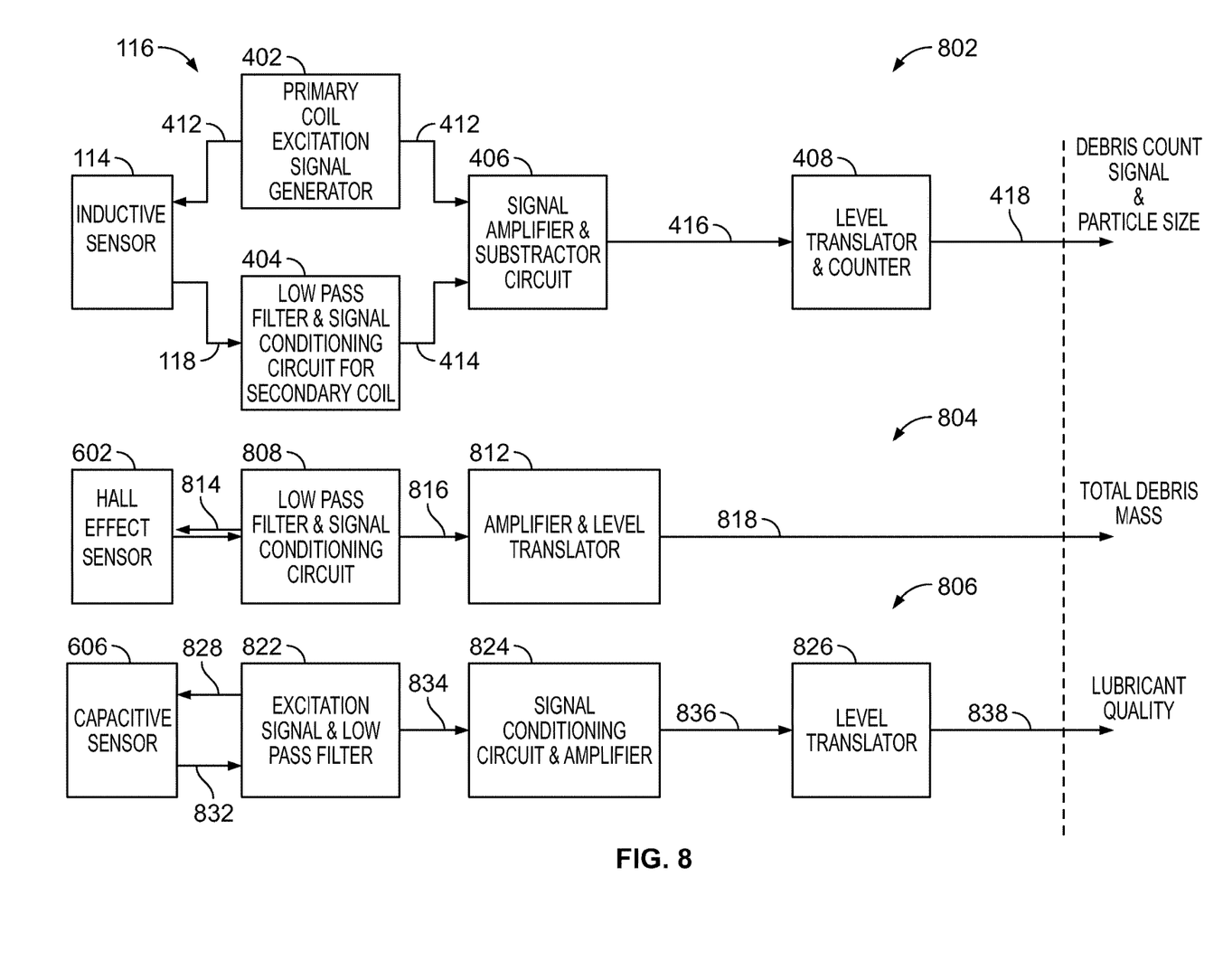
FIGS. 8 and 9 depict functional block diagrams of sensor processing systems that may be used with the sensor of FIGS. 6 and 7.

With the embodiment depicted in FIGS. 6 and 7, the sensor processing system 116 is coupled to receive the Hall sensor output signal the capacitive sensor output signal. The sensor processing system 116 is further configured, upon receipt of the Hall sensor output signal, to determine the cumulative weight of the detected debris particles, and is further configured, upon receipt of the capacitive sensor output signal, to determine the viscosity of the fluid. It should be noted that the magnetic field strength of the magnet 202 will vary depending upon the number of debris particles that are attracted by and contacting the magnet 202. It may thus be appreciated that the detection system 110 can only determine the cumulative weight of magnetic debris particles that have been attracted by and are contacting the magnet 202. One embodiment of the sensor processing system 116 implemented with this embodiment is depicted in FIG. 8, and with reference thereto will now be described.

The depicted sensor processing system 116 includes the previously described inductive sensor output signal processing circuitry 802 (i.e., the excitation signal generator 402, the signal conditioning circuitry 404, the amplifier and subtractor circuit 406, and the level translator and counter circuit 408). In addition, however, it includes Hall sensor output signal processing circuitry 804 and capacitive sensor output signal processing circuit 806.

The Hall sensor output signal processing circuitry 804 includes signal conditioning circuitry 808 and an amplifier and level translator circuit 812. The signal conditioning circuitry 808 is coupled to receive the Hall sensor output signal 814 from the Hall sensor 602. The signal conditioning circuitry 808 may be implemented using any one of numerous known circuit topologies and, at least in the depicted embodiment, additionally includes a low-pass filter, to thereby filter out any unwanted high frequencies in the sensor output signal 814. The signal conditioning circuitry 808 thus supplies a smoothed, filtered sensor output signal 816 to the amplifier and level translator circuit 812.

The amplifier and level translator circuit 812 receives the smoothed, filtered sensor output signal 816 from the signal conditioning circuitry 808. The amplifier and level translator circuit 812, using any one of numerous known circuit topologies, implements two functions. It generates a signal representative of the cumulative weight of the detected debris particles based on the smoothed, filtered sensor output signal 816, and it amplifies and supplies the signal representative of the cumulative weight 818.

The capacitive sensor output signal processing circuitry 806 includes and excitation and filter circuit 822, signal conditioning circuitry 824, and a level translator circuit 826. The excitation and filter circuit 822 is coupled to, and is configured to generate and supply an excitation signal 828 to, the capacitive sensor 606. The excitation and filter circuit 822 is also coupled to receive the capacitive sensor output signal 832 from the capacitive sensor 606. The excitation and filter circuit 822 includes a low-pass filter, to thereby filter out any unwanted high frequencies in the capacitive sensor output signal 832, and thus a filtered sensor output signal 834 to signal conditioning circuitry 824.

The signal conditioning circuitry 824 may be implemented using any one of numerous known circuit topologies and, at least in the depicted embodiment, additionally includes an amplify. The signal conditioning circuitry 824 thus supplies a smoothed, amplified sensor output signal 836 to the level translator circuit 826.

The level translator circuit 826 receives the smoothed, amplified sensor output signal 836 from the signal conditioning circuitry 824. The level translator circuit 826, using any one of numerous known circuit topologies, generates a signal 838 representative of the viscosity of fluid 112.

Figure 9:
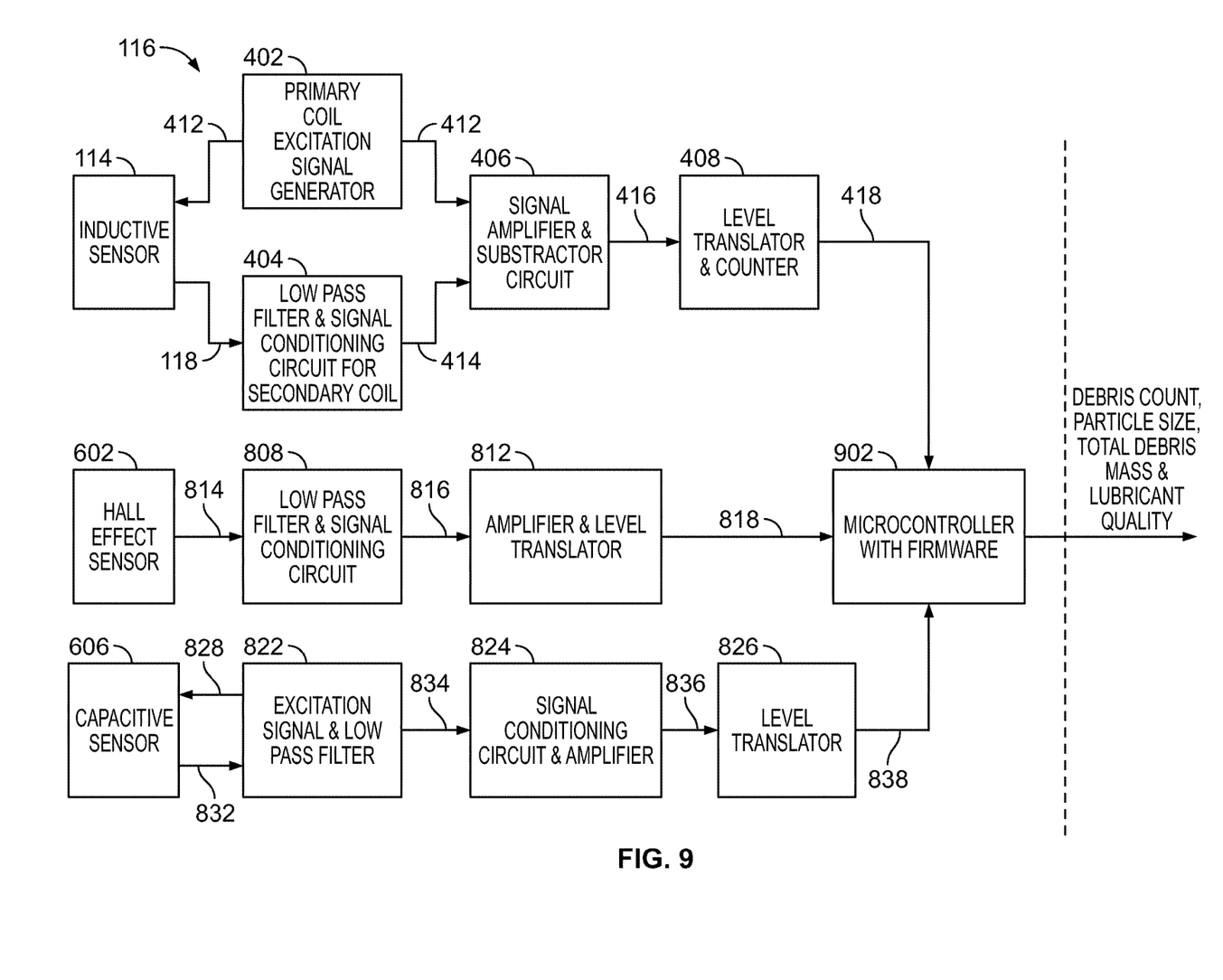

The inductive sensor output signal processing circuitry 802, the Hall sensor output signal processing circuitry 804, and the capacitive sensor output signal processing circuitry 806 supply the respective output signals 418, 818, 838 to the previously mentioned non-illustrated external circuitry for additional processing. In some embodiments, as shown in FIG. 9, the sensor processing system 116 may additionally include a microcontroller 902. The microcontroller 902 receives the signals 418, 818, 838 from the inductive sensor output signal processing circuitry 802, the Hall sensor output signal processing circuitry 804, and the capacitive sensor output signal processing circuitry 806, respectively. The microcontroller 902, using an onboard ADC, converts these signals to digital data representative of debris particle size, the number of debris particles that have interacted with the magnetic field, cumulative weight of the detected debris particles, and fluid viscosity. This information can be supplied to the non-illustrated external circuitry via, for example, a suitable communication interface such as CAN, RS232, etc.

The debris detection system described herein can provide not only quantitative information regarding debris, but qualitative information regarding the debris and the lubricant.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, on-chip ADC with microcontroller or external ADC to microcontroller, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A detection system for detecting debris in a fluid, comprising:
    an inductive sensor including a magnet, a primary coil surrounding the magnet, and a secondary coil surrounding the magnet, the magnet producing a magnetic field, the primary coil coupled to receive an excitation signal and configured, upon receipt of the excitation signal, to generate a primary magnetic flux, the secondary coil inductively coupled to the primary coil upon electrical excitation of the primary coil and configured to supply a sensor output signal having an output voltage magnitude that varies each time a debris particle in the fluid interacts with the magnetic field; and
    a sensor processing system coupled to the inductive sensor, the sensor processing system configured to supply the excitation signal to the primary coil and receive the sensor output signal from the secondary coil, the sensor processing system further configured, upon receipt of the sensor output signal, to (i) estimate a size of each debris that has interacted with the magnet field and (ii) determine a total number of debris particles that have interacted with the magnet field.

2. The detection system of claim 1, wherein the processing system estimates the size of each debris particle based on a determination of a change in the output voltage magnitude.

3. The detection system of claim 2, wherein the change in the output voltage magnitude is determined by subtracting the output voltage magnitude from the excitation signal.

4. The detection system of claim 1, wherein:
    the detection system further comprises a Hall sensor, the Hall sensor disposed adjacent to the magnet and configured to supply a Hall sensor output signal proportional to a sensed magnetic field strength; and
    the sensor processing system is further coupled to receive the Hall sensor output signal, and is further configured, upon receipt of the Hall sensor output signal, to determine a cumulative weight of the debris particles attracted by and contacting the magnet.

5. The detection system of claim 1, wherein:
    the detection system further comprises a capacitive sensor, the capacitive sensor disposed adjacent to the inductive sensor and configured to supply a capacitive sensor output signal proportional to a viscosity of the fluid; and
    the sensor processing system is further coupled to receive the capacitive sensor output signal, and is further configured, upon receipt of the capacitive sensor output signal, to determine the viscosity of the fluid.

6. A detection system for detecting debris in a fluid, comprising:
    an inductive sensor including a magnet, a primary coil surrounding the magnet, and a secondary coil surrounding the magnet, the primary coil coupled to receive an excitation signal and configured, upon receipt of the excitation signal, to generate a primary magnetic flux, the secondary coil inductively coupled to the primary coil upon electrical excitation of the primary coil and configured to supply a sensor output signal having an output voltage magnitude that varies each time a debris particle in the fluid interacts with the magnetic field;

a Hall sensor disposed adjacent to the magnet and configured to supply a Hall sensor output signal proportional to a sensed magnetic field strength; and a sensor processing system coupled to the inductive sensor and the Hall sensor, the sensor processing system configured to supply the excitation signal to the primary coil, receive the sensor output signal from the secondary coil, and receive the Hall sensor output signal from the Hall sensor, the sensor processing system further configured:

upon receipt of the sensor output signal, to (i) estimate a size of each debris that has interacted with the magnet field and (ii) determine a total number of debris particles that have interacted with the magnet field, and upon receipt of the Hall sensor output signal, to determine a cumulative weight of the debris particles attracted by and contacting the magnet.

7. The detection system of claim 6, wherein the processing system estimates the size of each debris particle based on a determination of a change in the output voltage magnitude.

8. The detection system of claim 7, wherein the change in the output voltage magnitude is determined by subtracting the output voltage magnitude from the excitation signal.

9. The detection system of claim 6, wherein:

the detection system further comprises a capacitive sensor, the capacitive sensor disposed adjacent to the inductive sensor and configured to supply a capacitive sensor output signal proportional to a viscosity of the fluid; and the sensor processing system is further coupled to receive the capacitive sensor output signal, and is further configured, upon receipt of the capacitive sensor output signal, to determine the viscosity of the fluid.

10. A detection system for detecting debris in a fluid, comprising:

an inductive sensor including a magnet, a primary coil surrounding the magnet, and a secondary coil surrounding the magnet, the primary coil coupled to receive an excitation signal and configured, upon receipt of the excitation signal, to generate a primary magnetic flux, the secondary coil inductively coupled to the primary coil upon electrical excitation of the primary coil and configured to supply a sensor output signal having an output voltage magnitude that varies each time a debris particle in the fluid interacts with the magnetic field;

a Hall sensor disposed adjacent to the magnet and configured to supply a Hall sensor output signal proportional to a sensed magnetic field strength;

a capacitive sensor disposed adjacent to the inductive sensor and configured to supply a capacitive sensor output signal proportional to a viscosity of the fluid; and a sensor processing system coupled to the inductive sensor, the Hall sensor, and the capacitive sensor, the sensor processing system configured to supply the excitation signal to the primary coil, receive the sensor output signal from the secondary coil, receive the Hall sensor output signal from the Hall sensor, and receive the capacitive sensor output signal from the capacitive sensor, the sensor processing system further configured:

upon receipt of the sensor output signal, to (i) estimate a size of each debris that has interacted with the magnet field and (ii) determine a total number of debris particles that have interacted with the magnet field, upon receipt of the Hall sensor output signal, to determine a cumulative quantity of the debris particles attracted by and contacting the magnet, and upon receipt of the capacitive sensor output signal, to determine the viscosity of the fluid.

11. The detection system of claim 10, wherein the processing system estimates the size of each debris particle based on a determination of a change in the output voltage magnitude.

12. The detection system of claim 11, wherein the change in the output voltage magnitude is determined by subtracting the output voltage magnitude from the excitation signal.

* * * * *